(12) United States Patent
Packett et al.

(10) Patent No.: US 10,710,286 B2
(45) Date of Patent: Jul. 14, 2020

(54) IN-MOLD CARPET LAMINATION (71) Applicant: NYX, Inc., Livonia, MI (US)

(72) Inventors: Joseph Packett, Livonia, MI (US); Ray Pepper, Livonia, MI (US); Jodi Imler, Livonia, MI (US); Akbal Grewal, Livonia, MI (US); Greg Homann, Livonia, MI (US)

(73) Assignee: NYX, INC., Livonia, MI (US)

( * ) Notice: Subject to any disclaimer, the term of this patent is extended or adjusted under 35 U.S.C. 154(b) by 502 days.

(21) Appl. No.: 15/437,042

(22) Filed: Feb. 20, 2017

(65) Prior Publication Data

US 2017/0239859 A1 Aug. 24, 2017

Related U.S. Application Data

(60) Provisional application No. 62/297,427, filed on Feb. 19, 2016.

(51) Int. Cl.
*B29C 45/14* (2006.01)
*D06N 7/00* (2006.01)
*B32B 7/12* (2006.01)
*B32B 27/32* (2006.01)
*B32B 5/06* (2006.01)
(Continued)

(52) U.S. Cl.
CPC .. *B29C 45/14065* (2013.01); *B29C 45/14786* (2013.01); *B29C 45/561* (2013.01); *B32B 3/02* (2013.01); *B32B 3/266* (2013.01); *B32B 5/02* (2013.01); *B32B 5/06* (2013.01); *B32B 5/26* (2013.01); *B32B 7/12* (2013.01); *B32B 27/08* (2013.01); *B32B 27/12* (2013.01); *B32B 27/32* (2013.01); *D06N 7/0076* (2013.01); *D06N 7/0078* (2013.01); *B29C 2045/14147* (2013.01); *B29K 2715/006* (2013.01); *B29L 2031/7322* (2013.01); *B32B 2250/03* (2013.01); *B32B 2250/24* (2013.01); *B32B 2262/0253* (2013.01); *B32B 2262/0276* (2013.01); *B32B 2307/30* (2013.01); *B32B 2307/50* (2013.01); *B32B 2307/554* (2013.01);
(Continued)

(58) Field of Classification Search
CPC ............................... D06N 7/0078; B23B 27/08
See application file for complete search history.

(56) References Cited

U.S. PATENT DOCUMENTS

| | | | | |
|---|---|---|---|---|
| 6,197,245 B1 * | 3/2001 | Usui | ................... | B29C 45/1705 264/572 |
| 6,537,669 B1 * | 3/2003 | Kaufmann | .............. | B29C 33/12 264/275 |
| 2003/0203150 A1 * | 10/2003 | Moran | ................ | B29C 49/0073 428/85 |

* cited by examiner

*Primary Examiner* — Ryan M Ochylski
(74) *Attorney, Agent, or Firm* — Carlson, Gaskey & Olds, P.C.

(57) ABSTRACT

A process for fabricating a molded carpet laminate includes supporting a carpet layer in a molding tool that has mold dies that define a mold cavity. The mold dies are then moved from an open position to a partially closed position. In the partially closed position, a heated polymer material is injected into the mold cavity. The heated polymer material incompletely fills the mold cavity on the working side of the carpet layer. The mold dies are then moved from the partially closed position to a closed position to spread the heated polymer material and fill the mold cavity on the working side of the carpet layer to form a molded polymer wall. The molded polymer wall adheres to the working side of the carpet layer to form a molded carpet laminate. The mold dies are then moved from the closed position and the molded carpet laminate is cooled.

15 Claims, 8 Drawing Sheets

(51) Int. Cl.
*B32B 27/08* (2006.01)
*B32B 5/02* (2006.01)
*B32B 5/26* (2006.01)
*B32B 3/26* (2006.01)
*B29C 45/56* (2006.01)
*B32B 3/02* (2006.01)
*B32B 27/12* (2006.01)
*B29L 31/00* (2006.01)

(52) U.S. Cl.
CPC ... *B32B 2307/5825* (2013.01); *B32B 2471/02* (2013.01); *D06N 2203/042* (2013.01)

IN-MOLD CARPET LAMINATION

CROSS-REFERENCE TO RELATED APPLICATION

The present disclosure claims priority to U.S. Provisional Patent Application No. 62/297,427, filed Feb. 19, 2016.

BACKGROUND

This disclosure relates to carpet laminates, such as carpet laminates used to line automotive interiors or other decorative surfaces.

A carpet laminate may include a carpet layer and a base layer. The base layer may be pre-fabricated and the carpet layer may then be glued to the base layer. However, the carpet layer tends to delaminate and pull away from the base layer.

In other examples, the base layer is injection molded to the carpet layer to form a carpet lamination. The injection molding may include high pressure injection of a molding material onto the non-decorative side of the carpet layer. However, the clamping of the carpet layer in a mold and the heat generated by the high pressure injection tend to damage the carpet. Additionally, the shape of the carpet lamination is very limited because the carpet layer tends to wrinkle in the mold.

SUMMARY

A process for fabricating a molded carpet laminate according to an example of the present disclosure includes supporting a carpet layer in a molding tool that has mold dies that define a mold cavity. The mold dies are then moved from an open position to a partially closed position. In the partially closed position, a heated polymer material is injected into the mold cavity. The heated polymer material incompletely fills the mold cavity on the working side of the carpet layer. The mold dies are then moved from the partially closed position to a closed position to spread the heated polymer material and fill the mold cavity on the working side of the carpet layer to form a molded polymer wall. The molded polymer wall adheres to the working side of the carpet layer to form a molded carpet laminate. The mold dies are then moved from the closed position and the molded carpet laminate is cooled.

A molded carpet laminate according to an example of the present disclosure includes a carpet layer that has a working side and a finish side. There is an adhesive film on the working side. The adhesive film adheres a molded polymer wall to the working side.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
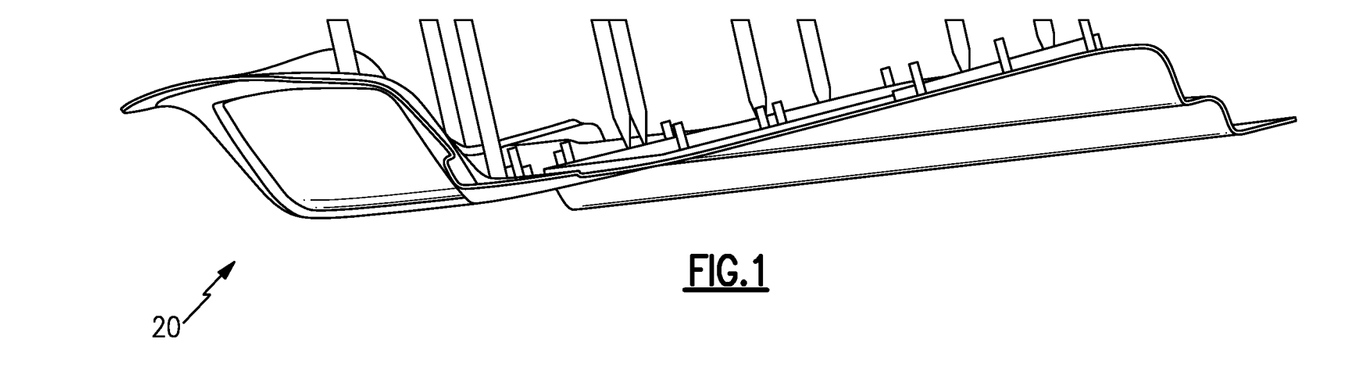
FIG. 1 illustrates an example molded carpet laminate.

FIG. 1 schematically illustrates an example of a molded carpet laminate 20 (hereafter "laminate 20"). As will be described herein, the laminate 20 includes unique features and is fabricated by a unique molding process.

Figure 2:
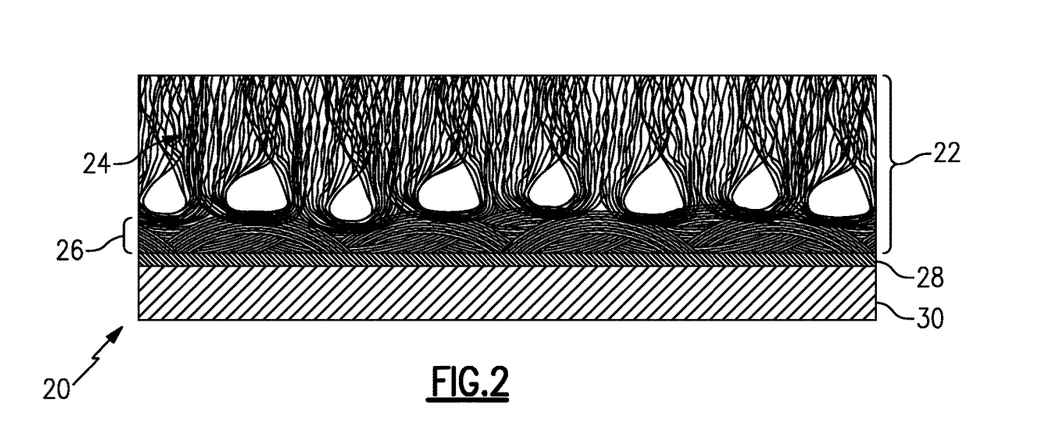
FIG. 2 illustrates a sectioned view of the molded carpet laminate of FIG. 1.

FIG. 2 illustrates a sectioned view of the laminate 20. The laminate 20 includes a carpet layer 22. The carpet layer 22 includes fibers 24 that are secured to a backing 26. As will be appreciated, the fibers 24 and backing 26 are not particularly limited to any specific kinds. As examples, the fibers 24 may be polyester or polypropylene fibers. Most typically, the backing will be a synthetic fabric backing, such as a polypropylene fabric. The fibers 24 may be secured to the backing 26 by way of stitching, but are not limited to stitching.

The laminate 20 further includes an adhesive film 28. The film 28 bonds the carpet layer 22 to a molded polymer wall 30. For example, the molded polymer wall 30 is of sufficient strength and rigidity to support and hold the carpet layer 22 in a contoured shape, such as that shown in FIG. 1. That is, most typically, unlike a flexible mat or throw rug, the laminate 20 is self-supporting and holds its contoured shape.

The carpet layer 22 defines two distinct sides with respect to the fibers 24 and backing 26. As used herein, the side of the carpet layer 22 with the fibers 24 is a finish side, i.e., the fibers 24 provide the decorative appearance of the laminate 20. The side of the carpet layer 22 with the backing 26 is a working side, i.e., the backing 26 is non-decorative and is the side to which the molded polymer wall 30 is adhered. Further features of the laminate 20 are described below in connection with fabrication of the laminate 20.

The laminate 20 is fabricated in a hybrid injection molding process. As will be described, unlike traditional injection molding under high pressure, the hybrid injection molding process uses low pressure in combination with a compression molding step to enable fabrication of the laminate 20 without many of the shortcomings of traditional injection molding that sacrifice the quality of the final article.

Figure 3A:
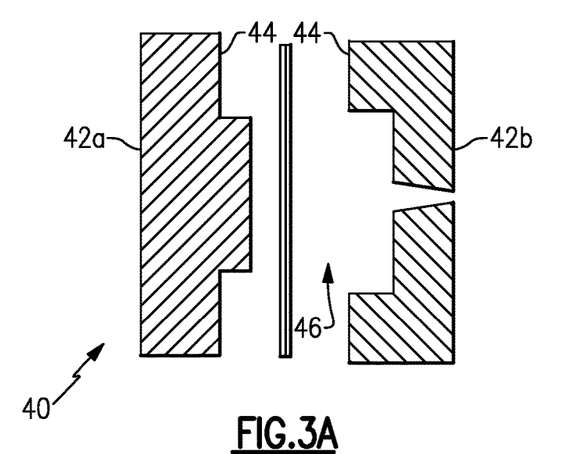
FIGS. 3A, 3B, and 3C illustrate a mold tool in, respectively, an open position, a closed position, and a partially closed position.

FIG. 3A illustrates an example mold tool 40 for the process. The mold tool includes first and second mold dies 42a/42b. As will be appreciated, although not shown, the mold dies 42a/42b are situated in a molding press that is capable of moving at least one of the mold dies 42a/42b. In this example, the second mold die 42b is stationary and the first mold die 42a is moveable relative to the second mold die 42b. Each of the mold dies 42a/42b includes a mold surface 44. The mold surfaces 44 together define a mold cavity 46 there between.

Figure 3B:
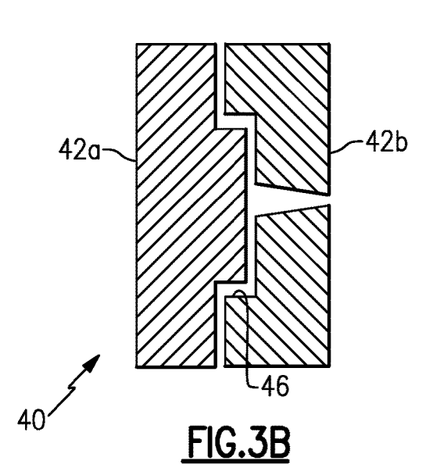
Figure 3C:
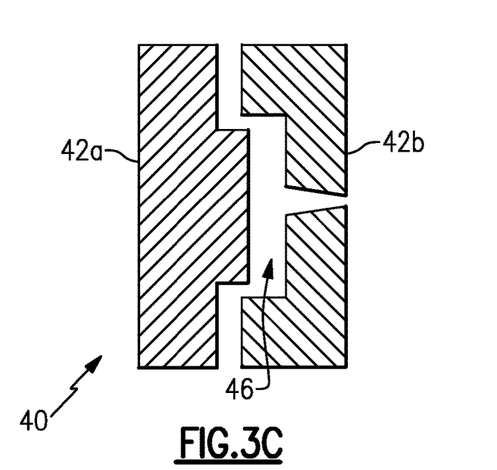

FIG. 3A depicts the mold tool 40 in an open position. Referring also to FIGS. 3B and 3C, FIG. 3B depicts the mold tool 40 in a closed position and FIG. 3C depicts the mold tool 40 in a partially closed position. In the partially closed position, the distance between the mold dies 42a/42b is intermediate of the distances between the mold dies 42a/42b when in the open position and the closed position.

Figures 4A, 4B, 4C:
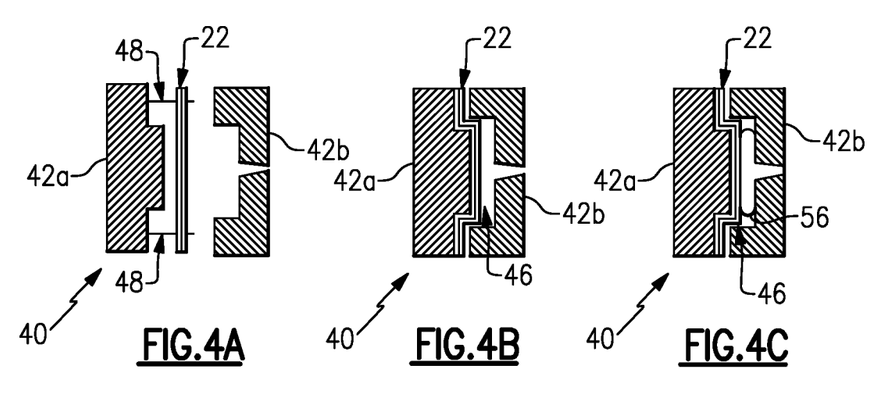
FIGS. 4A, 4B, 4C, 4D, and 4E illustrate a mold tool and carpet layer at various stages in a molding process.

FIGS. 4A, 4B, 4C, 4D, and 4E depict various stages during the molding process of the laminate 20. As shown in FIG. 4A, the carpet layer 22 is first supported in the molding tool 40, and the molding tool 40 is in the open position. In this example, the finish side of the carpet layer 22 faces the first mold die 42a, and the working side of the carpet layer 22 faces the second mold die 42b. The adhesive film 28 may be pre-laminated to the carpet layer 22. As an example, the carpet layer 22 has through-holes and is supported on one or more pins 48 in the mold tool 40 that extend through the through-holes of the carpet layer 22.

Figures 5A, 5D:
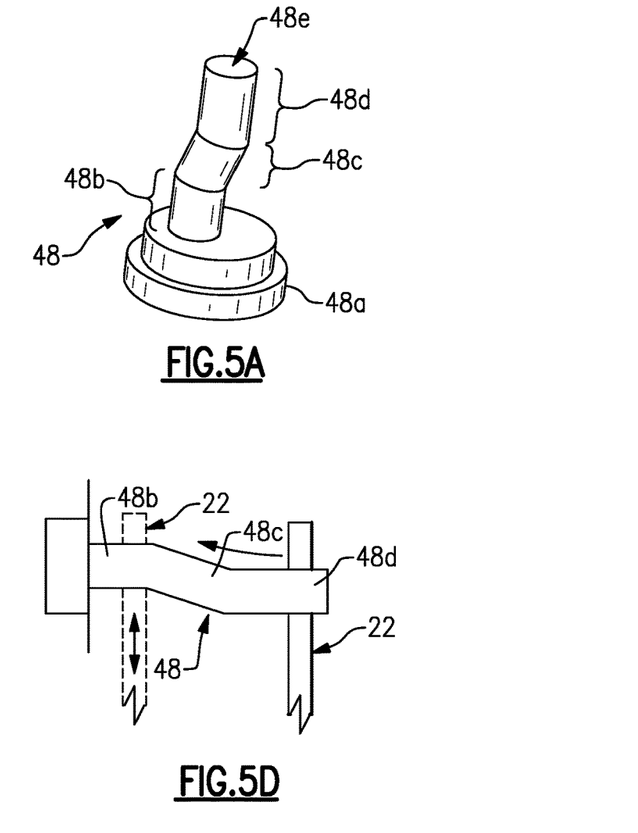
FIG. 5A illustrates an example of an eccentric pin for use in a molding tool.
FIG. 5D illustrates an example of a carpet layer moving over an eccentric pin.
Figure 5B:
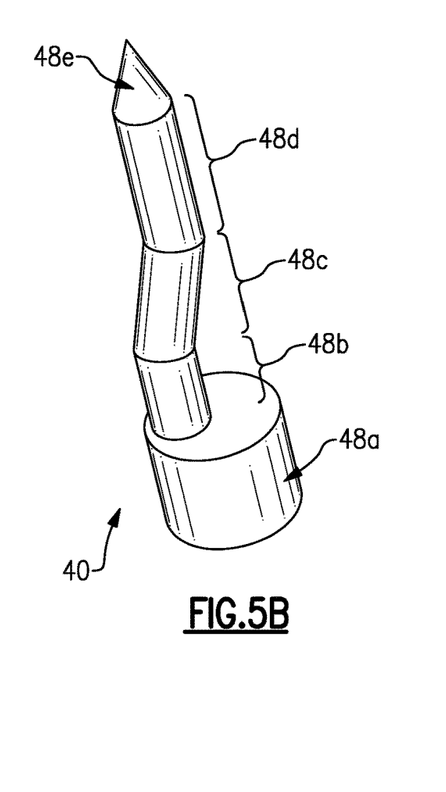
FIG. 5B illustrates another example of an eccentric pin for use in a molding tool.

FIG. 5A illustrates a further representative example of the pin 48. Here, the pin 48 is an eccentric pin that has a base section 48a, a proximal section 48b that extends from the base section 48a, a transverse section 48c that extends obliquely from the proximal section 48b, and a distal section 48d that extends from the transverse section 48c. As an example, the proximal section 48b and the distal section 48d are linear and parallel. The transverse section 48c serves to offset the distal section 48d from the proximal section 48b such that these sections 48b/48d are non-coaxial. In the illustrated example, the pin 48 has a blunt end 48e. Alternatively, as shown in a modified example in FIG. 5B, the pin 48 has a tapered end 48e, which may serve to guide the through-holes of the carpet layer 22 onto the pins 48. In further alternatives, one or more of the sections 48b/48c/48d may be curved rather than linear, or the pin 48 may have a continuous curvature without distinct sections.

Initially, the carpet layer 22 is supported on the distal sections 48d of the pins 48. In such a support position, the carpet layer 22 hangs relatively loose in the mold tool 40. For instance, the pins 48 in the mold tool 40 and the through-holes in the carpet layer 22 may be positioned such that the carpet layer 22 has little or no slack once hung on the pins 48, although some slack may be desired to permit the carpet layer 22 to initially be drawn toward the mold surface 44 with minimal tension on the carpet layer 22. The hanging permits the carpet layer 22 to hang in the mold tool 40 with minimal tension, without wrinkles that might otherwise lead to defects in the laminate 20, and with enough slack (if desired) to draw the carpet layer 22 to relatively deep contours of the mold surface 44 of the first mold die 42a.

Figure 5C:
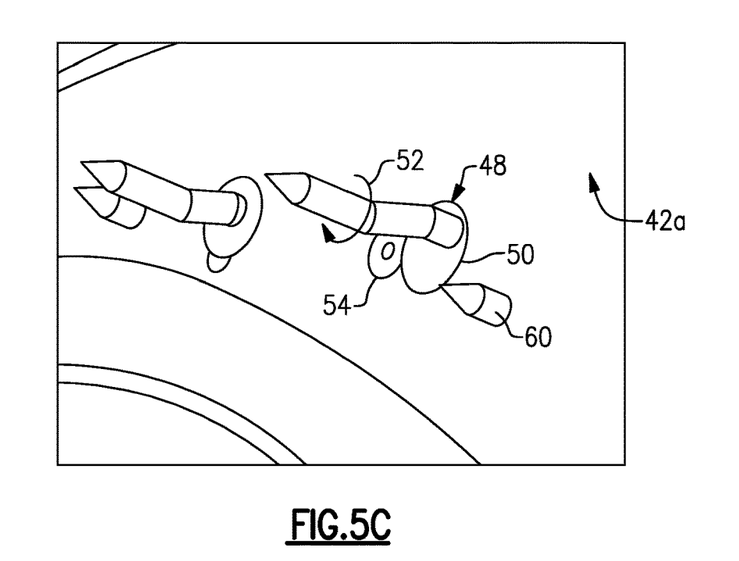
FIG. 5C illustrates an example of an eccentric pin in a molding tool.

FIG. 5C depicts one of the pins 48 mounted on the first mold die 42a of the mold tool 40. For example, the pins 48 may be located outside of the mold cavity 46, which form the end use shape of the laminate 20. In this example, the first mold die 42a includes a pocket 50 that corresponds in geometry to the base section 48a of the pin 48. The pocket 50 and base section 48a are cylindrical such that the pin 48 is rotatable in the pocket 50, as indicated at arrow 52. The cylindrical shape permits infinite adjustment. The rotation permits the orientation of the pin 48 in the mold tool 40 to be adjusted. As will be appreciated, polygonal non-cylindrical shapes can alternatively be used and may provide incremental adjustment rather than infinite. Once in a desired position, the pin 48 may be locked in place, such as by lock screw 54.

The rotation of the pin 48 changes the relative orientation of the proximal and distal sections 48b/48d because of the offset or eccentric design of the pin 48. Thus, by rotating the pin 48, the relative distance of the proximal and distal sections 48b/48d to a constant reference point in the mold cavity 46 can be adjusted. Most typically, the mold tool 40 will include a plurality of such pins 48 arranged around the outside of the mold cavity 46. Adjustment of the rotational orientation of the pins 48 thus permits the mold tool 40 to accommodate variations in the shape of the carpet layer 22 and position of the through-holes in the carpet layer 22, while also reducing the potential that such variations will lead to hang positions that vary greatly between tautness and slack. The further function of the pins 48 and eccentric shape will be described in further detail below in connection with a later step of the molding process.

Referring to FIG. 4B, with the carpet layer 22 in the molding tool 40, the mold dies 42a/42b are moved from the open position to the partially closed position. As an example, the partially closed position may correspond to a predesignated or preprogrammed distance between the mold dies 42a/42b. The movement may cause the carpet layer 22 to conform or partially conform to the mold surface 44 of the first mold die 42a.

As the mold dies 42a/42b conform the carpet layer 22, the carpet layer 22 slides on the pins 48. For example, the proximal sections 48b of the pins 48 will most typically be oriented toward the outside of the mold tool 40, and the distal sections 48d will most typically be oriented toward the inside of the mold tool 40. As illustrated in FIG. 5D, when the mold dies 42a/42b move to the partially closed position, the carpet layer 22 is urged to slide along the pins 48 from the distal section 48d, over the transverse section 48c, and to the proximal section 48b. The effect of this movement is to apply tension to the carpet layer 22 as it is conformed over the contoured shape of the mold surface of the first mold die 42a. The tension, in turn, reduces wrinkles in the carpet layer 22. Thus, the carpet layer 22 can initially be hung relatively loose on the distal sections 48d of the pins 48 to permit slack to draw the carpet layer 22 over the contours of the mold surface 44 of the first mold die 42a, and then pulled taut over the proximal sections 48b of the pins 48 to reduce bunching and wrinkling of the carpet layer 22 during molding. As will be further appreciated, the adjustability of the pins 48 also provides the ability to fine tune the tension to virtually eliminate bunching and wrinkling. If any bunching or wrinkling occurs, one or more of the pins 48 can be adjusted to change the tension and eliminate the bunching/wrinkling. The design of the carpet layer 22 can also be selected to tailor the ability of the carpet layer 22 to stretch. Although not limited, in one example, the carpet layer 22 has the following properties:

| COMPOSITION | | |
|---|---|---|
| FACE FIBER | 85% POLYESTER- | ASTM D276 |
| BINDER FIBER | 15% POLYESTER- | ASTM D276 |
| FABRIC BACKING | POLYPROPYLENE | ASTM D276 |

-continued

| CONSTRUCTION | | |
|---|---|---|
| Percent PIR/PRC- | 60 | ISO1765 |
| FIBER DENIER | 8 (FACE FIBER) + | ISO1765 |
| | 9 (BINDER FIBER) | ISO1765 |
| FACE FIBER THICKNESS | 4.5 +/− 0.5 mm | ISO1765 |
| FACE FIBER WEIGHT | 461 +/− 47 GSM | ASTM D5848 |
| BINDER FIBER | 81 +/− 8 GSM | ASTM D5848 |
| PRIMARY BACKING | 44 +/− 10 GSM | ASTM D5848 |
| PHYSICAL PROPERTIES | | |
| Breaking strength WMD- | 805 N min | ASTM D5034 Grab |
| Breaking strength AMD | 934 N min | ASTM D5034 Grab |
| Tear strength WMD | 552 N min | ASTM D5587 (1) |
| Tear strength AMD | 485 N min | ASTM D5587 (1) |
| Heat Aging | Rate 4 min | ISO105-A2 Proc 1 |
| WEAR PROPERTIES | | |
| RESISTENCE TO ABRESION | No excess wear And substrate Material visible | SAE J1530-A 500 g/H10/1200 |
| RESISTENCE TO SNAGGING | No fiber pullout | SAE J1530-A 500 g/H18/50 |

The adhesive film 28 also moves with the carpet layer 22. For instance, if the carpet layer 22 is tensioned and stretched, the adhesive layer 28 also stretches. In this regard, the adhesive layer has properties that permit it to move and stretch with the carpet layer 22, which reduces the potential for delamination of the adhesive layer 28 from the carpet layer 22. In this regard, the adhesive layer 28 may be selected with a particular melt flow index. As an example, the melt flow index of the adhesive film 28 is equal or greater than 6 grams per ten minutes. Melt flow index is a common measurement and, given this disclosure, one of ordinary skill in the art will be able to determine melt flow indices. As an example, the measurement of the melt flow index for polyethylene involves a measurement of polyethylene pushed through a 2 mm diameter die at 190° C. with 2.16 kg mass.

Referring to FIG. 4C, in the partially closed position, a heated polymer material 56 is injected into the mold cavity 46 against the working side of the carpet layer 22. For example, the heated polymer material 56 is provided through one or more runners in the second mold die 42b. The injection pressure used in this step is much lower than injection pressures used in typical injection molding processes. In this step, the heated polymer material 56 incompletely fills the mold cavity 46. The incomplete filling enables the lower molding pressure because the process is not dependent on the mold pressure to fill out all regions of the mold cavity 46. With the lower pressure, there is also less frictional heating of gases and of the mold material during injection, thus facilitating keeping the temperature of the carpet layer 22 relatively low to reduce the potential for thermal damage. Additionally, the mold dies 42a/42b may include internal channels for circulating coolant to control the temperature of the mold dies 42a/4b, and thus control the temperature that the carpet layer 22 is exposed to. As an example, a difference of at least −30° F. is maintained between a maximum temperature of the second mold die 42b and a maximum temperature of the first mold die 42a, i.e., the temperature of the first mold die 42a is lower than the temperature of the second mold die 42b by 30° F.

Figure 4D:
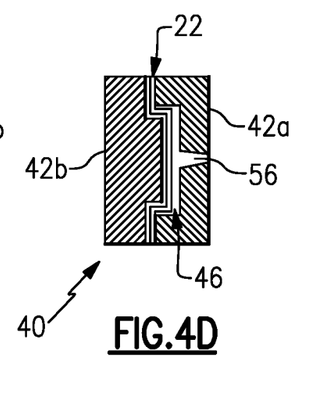

As shown in FIG. 4D, the mold dies 42a/42b are then moved from the partially closed position to the closed position. This movement compresses the heated polymer material 56 in the mold cavity 46. The compression spreads the heated polymer material 56 and fills the mold cavity 46 on the working side of the carpet layer 22 to form the molded polymer wall 30.

The adhesive film 28 may be activated in this step to adhere the polymer material 56/polymer wall 30 with the carpet layer 22. For example, the adhesive film 28 is formed of a material that softens, melts, or partially melts with exposure to the heated polymer material 56. In one example, the film 28 thermally activates at about 120-128° C. The softening or melting facilitates chemical bonding between the adhesive film 28 and the polymer material 56. As an example, the adhesive film 28 may be chemically similar to the polymer material 56 to facilitate chemical bonding. For instance, the adhesive film 28 and the polymer material 56 may both be or may both include a polyolefin, such as but not limited to, polypropylene or polyethylene. Thus, the heat of the melted polymer material 56 during the process serves to soften, melt, or partially melt the chemically similar adhesive film 28. The adhesive film 28 thus facilitates bonding between the molded polymer wall 30 and the carpet layer 22, which would otherwise rely more so on bonding between chemically dissimilar material, thereby leading to weaker bonding and higher potential for delamination.

Figure 4E:
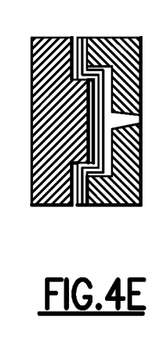

Referring to FIG. 4E, the mold dies 42a/42b are then moved from the closed position to a relaxed position. The relaxed position in this step may or may not be the same as the partially closed position described with reference to FIG. 4B or the open position described with reference to FIG. 4A. In the relaxed position the laminate 20 cools prior to removal from the mold tool 40. As will be described below, the mold tool 40 may include additional features to facilitate reduction in thermal warpage of the laminate 20 during cooling. Thermal warpage refers to distortion of an article due to differential cooling.

Figure 6A:
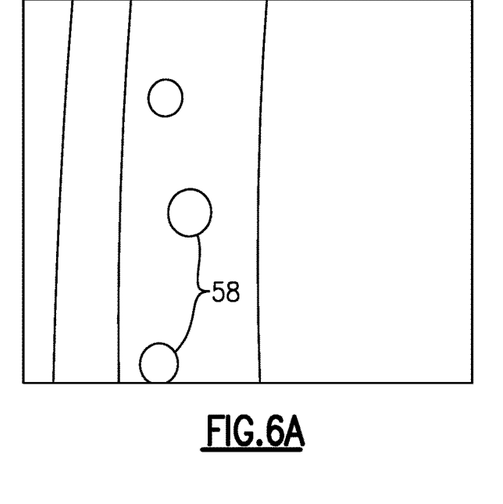
FIG. 6A illustrates a through-hole in a molded carpet laminate, for reducing thermal warpage.
Figure 6B:
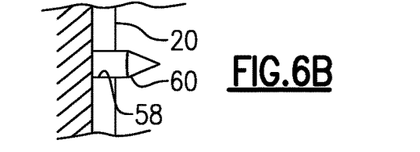
FIGS. 6B and 6C illustrate a molded carpet laminate with a pin extending in a through-hole of the laminate, to reduce thermal warpage.
Figure 6C:
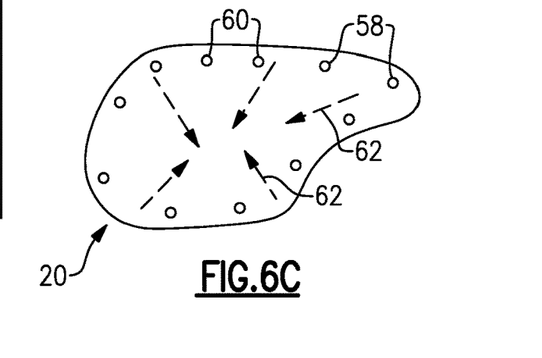

FIG. 6A illustrates a representative view of a portion of the laminate 20, namely a periphery region of the laminate 20. As shown, the laminate 20 includes one or more through-holes 58. Such through-holes 58 may be present around the entire periphery of the laminate 20. At least one of the mold dies 42a/42b may include corresponding pins that mechanically engage the through-holes 58. One such pin is shown in FIG. 5C at 60. As illustrated in FIG. 6B, the each such pin 60 extends in a corresponding one of the through-holes 58. As depicted in FIG. 6C, in the relaxed position as the laminate 20 cools prior to removal from the mold tool 40, the mechanical engagement between the pins 60 and through-holes 58 retards shrinkage, as indicated generally at arrows 62, to reduce thermal warpage.

Figure 7A:
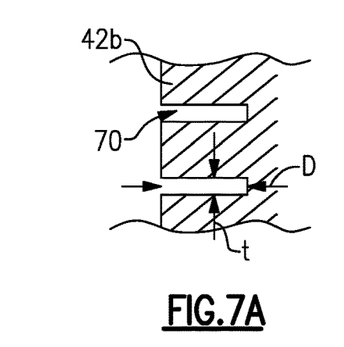
FIG. 7A illustrates a slot in a mold die of a mold tool, for reducing thermal warpage of a molded carpet laminate.
Figure 7B:
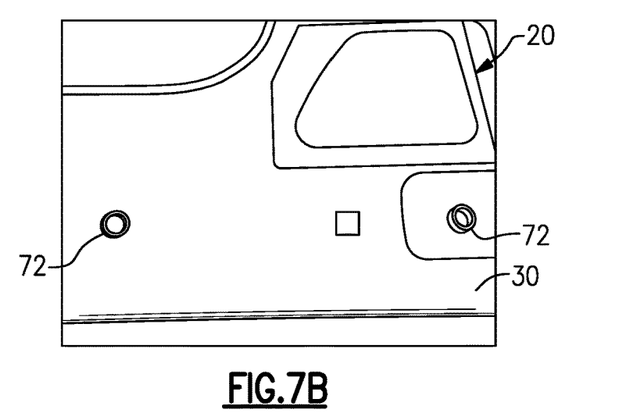
FIG. 7B illustrates a molded carpet laminate that has a projection formed from the slot shown in FIG. 7A.

FIGS. 7A and 7B depict another option for reducing thermal warpage. In this example, as shown in FIG. 7A, the second mold die 42b includes one or more slots 70. Each such slot 70 defines a depth (D) into the second mold die 42b and a thickness (t) perpendicular to the depth. In one example, the slot 70 has an aspect ratio of D/t of greater than one. In a further example, the aspect ratio of D/t is greater than two. Upon injection and compression of the polymer material 56, the polymer material 56 fills into the slot 70. The negative feature of the slot 70 produces a corresponding projection 72 on the molded polymer wall of the laminate 20. During cooling of the laminate 20 in the relaxed position of the mold dies 42a/42b, the projection 72 is interlocked with the slot 70. Similar to the pins 60 and through-holes 58, the mechanical interlocking retards shrinkage to reduce thermal warpage of the laminate 20.

Figure 8:
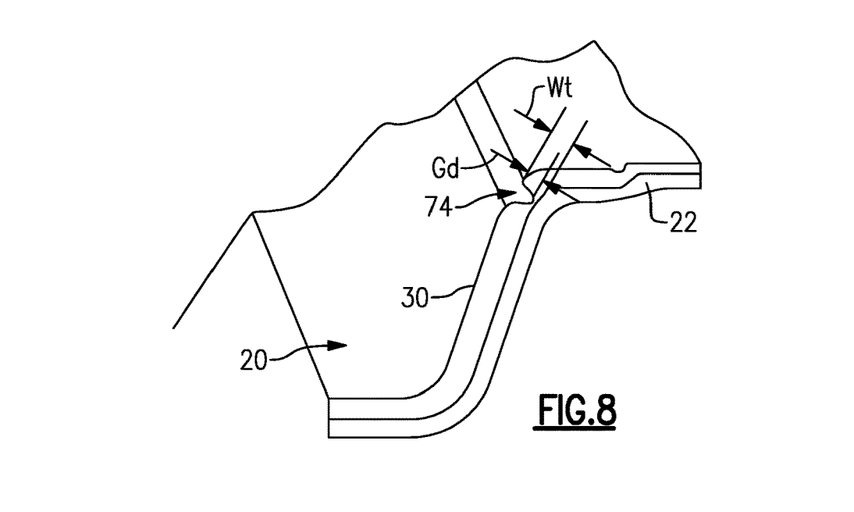
FIG. 8 illustrates a molded carpet laminate that has a groove to reduce thermal warpage.

FIG. 8 illustrates another option for reducing thermal warpage in the laminate 20. In this example, a representative portion of the laminate 20 is shown. For instance, the portion is a periphery region of the laminate 20 near a terminal edge. Here, the molded polymer wall 30 includes a groove 74. The groove 72 defines a groove depth (Gd) and the molded polymer wall 30 defines a local wall thickness (Wt). The groove has a depth ratio Gd/Wt of about 0.3 to about 0.8. In further examples, the ratio is 0.3 to 0.5.

The edges of a laminate have more free surface area and tend to cool at a higher rate than interior portions of the laminate that have less free surface area. As a result, particularly near the edges, the laminate may tend to thermally warp. To facilitate negating this effect, the laminate include the groove 74. The groove 74 increases surface area and reduces thickness, thus increasing the cooling rate toward the rate at the edges. With less of a cooling rate differential, thermal warpage may be reduced.

Figure 9A:
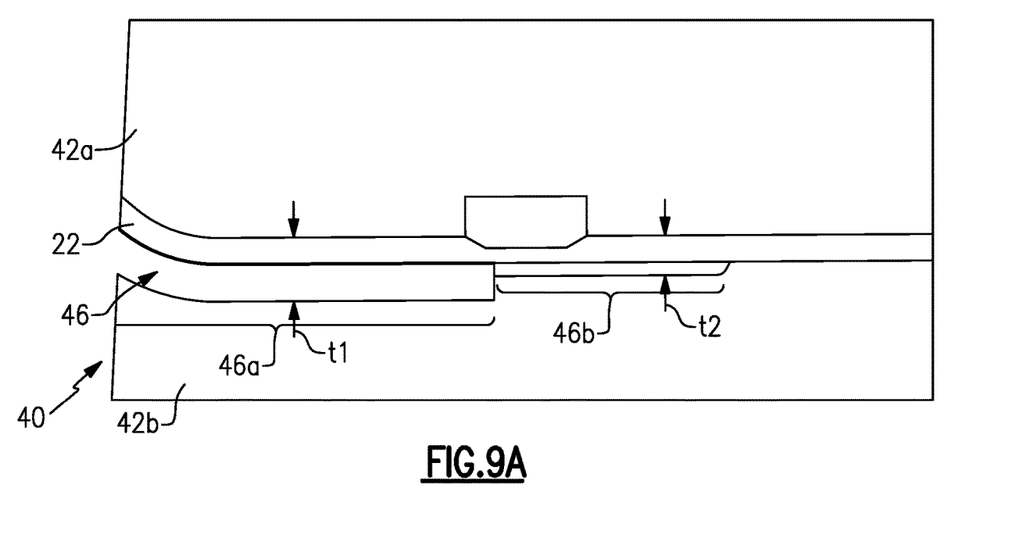
FIG. 9A illustrates a sectioned view of a mold tool that has a gutter, for reducing thermal warpage.

FIG. 9A illustrates another option for reducing thermal warpage in the laminate 20. This example illustrates a representative sectioned view of an edge or periphery of the mold tool 40, with the mold dies 42a/42b in the closed position and the carpet layer 22 disposed in the mold cavity 46. In this example, the mold cavity 46 includes an interior cavity portion 46a and a gutter 46b that circumscribes the interior cavity portion 46b. The interior cavity portion 46a has a substantially uniform interior cavity thickness (t1) from the first mold die 42a to the second mold die 42b. The gutter 46b has a gutter thickness (t2) from the first mold die 42a to the second mold die 42b. As will be appreciated, the thicknesses t1 and t2 may alternatively be taken relative to the nominal distance between the second mold die 42b and the working side of the carpet layer 22. Assuming the carpet layer 22 is of substantially uniform thickness, the relative magnitudes of the thicknesses t1 and t2 would be the same whether taken to the first mold die 42a or the working side of the carpet layer 22. In the closed position as shown, the gutter thickness (t2) is 80% or less of the uniform interior cavity thickness (t1). In a further example, the gutter thickness (t2) is also 25% or greater of the uniform interior cavity thickness (t1). That is, the gutter 46b is thinner than the interior cavity portion 46a and t2 may be from 25% to 80% of t1. In further examples, t2 is 40%, 50%, 60%, or 70% of t1.

Figure 9B:
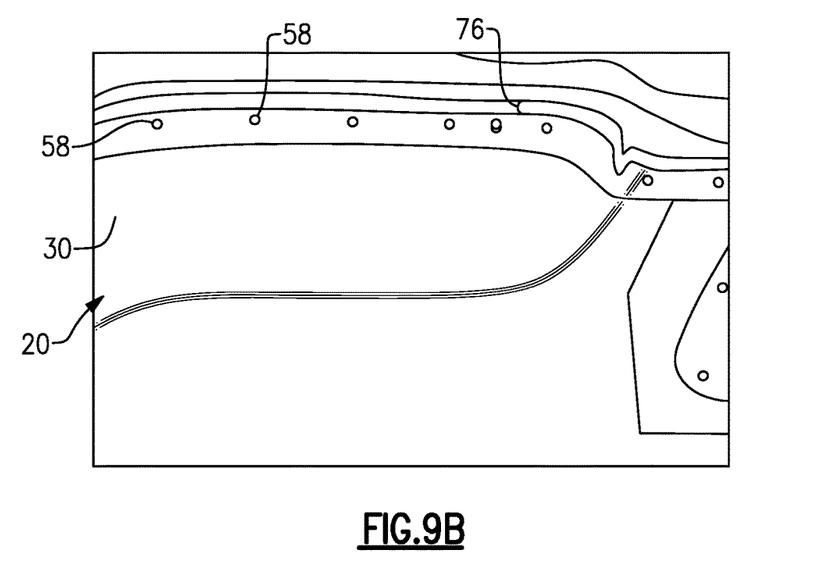
FIG. 9B illustrates a molded carpet laminate formed by a mold tool as in FIG. 9A, with a flange formed by the gutter.

The polymer material 56 flows from the interior cavity portion 46a into the gutter 46b. The polymer material 56 in the gutter forms a thin flange around the periphery of the molded polymer wall 30. An example is shown in FIG. 9B. Here, the laminate 20 includes a flange 76 around the periphery of the molded wall 30. The flange 76 is not part of the final geometry of the laminate 20. That is, the flange 76 is a temporary part of the molded polymer wall 30 and is removed, such as by trimming, prior to use of the laminate 20 in an automobile or other end use.

As described earlier, the edges of a laminate tend to cool at a higher rate than interior portions of the laminate. As a result, particularly near the edges, a laminate may tend to thermally warp, which can lead to delamination between a carpet layer and a molded polymer wall. The gutter 46b and resulting thin flange 76 of the molded polymer wall 30 facilitate negating this effect. The flange 76 provides a temporary peripheral region on the molded polymer wall 30 that may cool at a faster rate than the interior of the molded polymer wall 30. Thus, the interior of the molded polymer wall 30 is able to cool more uniformly. The flange 76, which may warp due to the differential cooling, is later removed and the remaining interior portion has less warp than it would have without the flange 76.

The mold tool 40 and design of the laminate 40 may also include features that facilitate enhancement of the quality of the laminate 20. For example, in injection molding processes, a carpet layer can relatively easily slip in the mold tool during the process and lead to bunching/wrinkling. Additionally, and particularly for deep draws (e.g., 8 inches or greater than approximately six inches) a carpet layer can relatively easily bunch/wrinkle near corners and may be damaged by edges of a mold tool.

Figure 10:
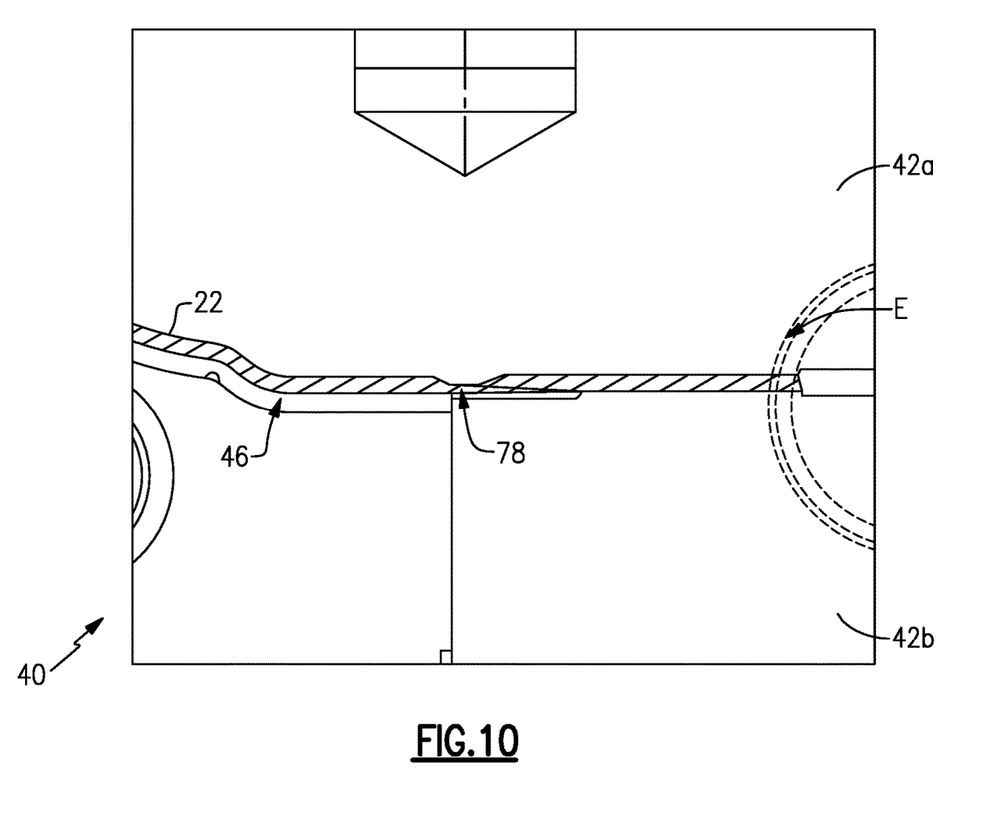
FIG. 10 illustrates a sectioned view of a mold tool that has a bead, to pinch a carpet layer during a molding process.

In this regard, as shown in FIG. 10, the mold tool 40 may include a bead 78 near an edge (E) of the first mold die 42a. For example, the bead 78 is elongated and extends along the edge of the first mold die 42a, and in some examples may entirely around the periphery of the first mold die 42a.

The bead 78 serves several functions. First, as the carpet layer 22 is being conformed to the mold surface 44 of the first mold die 42a (e.g., see FIG. 4B and description), the sides of the carpet layer 22 are drawn further into the mold tool 40. In doing so, the carpet layer 22 moves or slides across the bead 78. The bead 78 is free of low radius corners and, for example, may be rounded without corners. The bead 78 displaces the carpet layer 22 from the mold surface 44, thereby reducing the potential for the carpet layer 22 to more directly contact corners in the first mold die 42. Second, as the mold tool 40 closes, the bead 78 pinches the carpet layer 22 against the opposed second mold die 42b. The pinching reduces the ability of the carpet layer 22 to slide and draw into the mold tool 40. This further reduces the potential that the carpet layer 22 comes into contact with a corner while under pressure, while also serving to hold and tension the carpet layer 22 to reduce bunching/wrinkling.

Figure 11A:
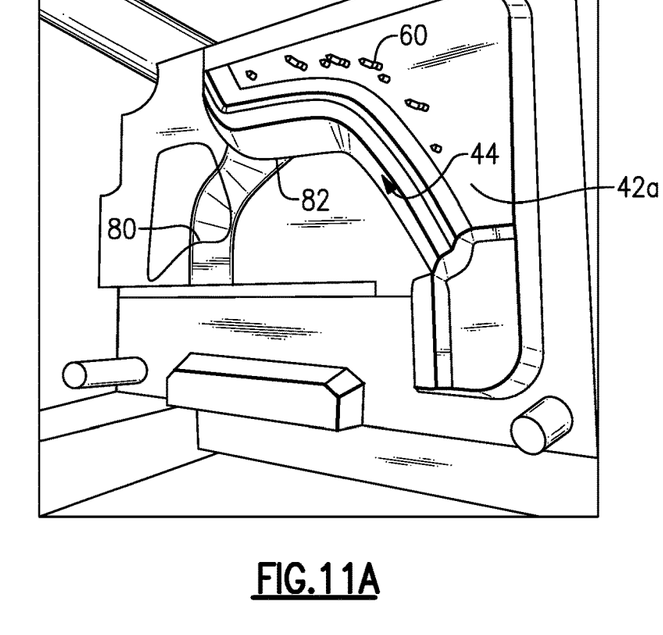
FIGS. 11A, 11B, and 11C illustrate inside and outside corners of a mold tool.
Figure 11B:
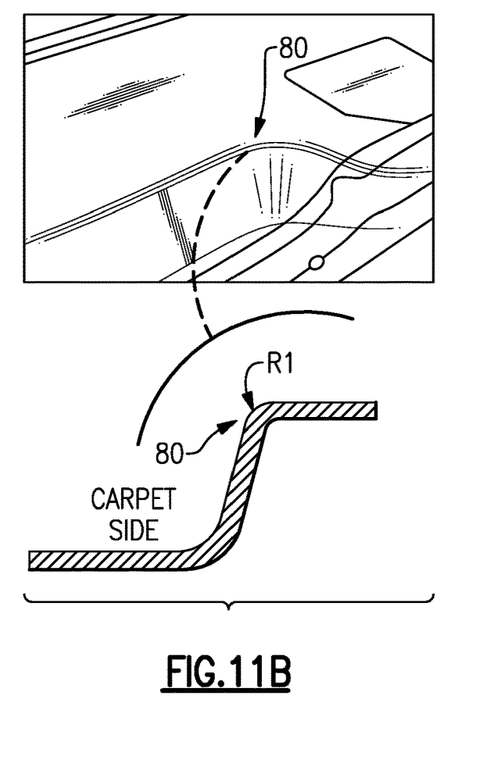
Figure 11C:
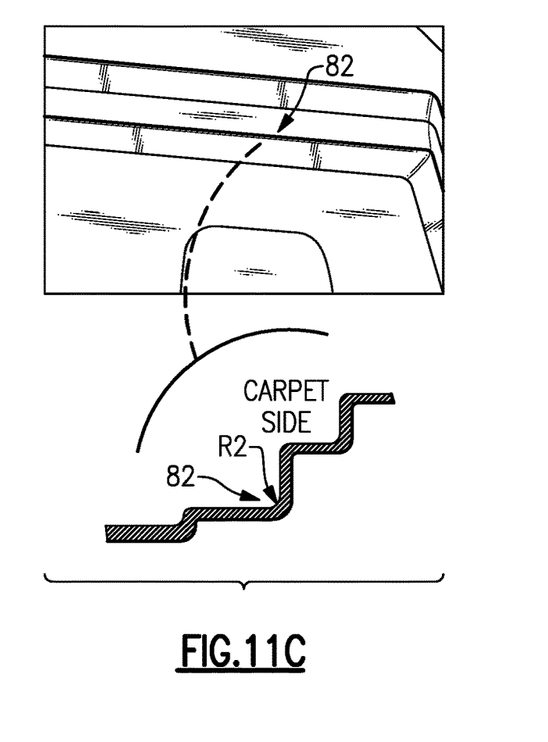

FIGS. 11A, 11B, and 11C, illustrate further examples in which the mold tool 40 has features to reduce bunching/wrinkling. For instance, FIG. 11A depicts the first mold die 42a, with its mold surface 44. The mold surface 44 is contoured and includes outside corners 80 and inside corners 82. Outside corners are projections of the mold surface 44 and inside corners are depressions in the mold surface 44. Particularly for deep draws, a carpet layer can relatively easily bunch/wrinkle near corners.

FIG. 11B illustrates a representative example of one of the outside corners 80 and its cross-section in an included view. As shown, the outside corner 80 has a radius of curvature (R1), and the radius of curvature is 20 millimeters or greater. In a further example, all of the outside corner radii of curvature of the mold die 42a are 20 millimeters or greater. As will be appreciated, the examples are also applicable to the second mold die 42b.

FIG. 11C illustrates a representative example of one of the inside corners 82 and its cross-section in an included view. As shown, the inside corner 82 has a radius of curvature (R2), and the radius of curvature is 25 millimeters or greater. In a further example, all of the inside corner radii of curvature of the mold die 42a are 25 millimeters or greater. As will be appreciated, the examples are also applicable to the second mold die 42b.

The radii of curvature R1 and R2 facilitate the reduction of bunching/wrinkling, as well as a reduction in relatively sharp pressure points that may otherwise crush the carpet layer 22. For instance, the radii of curvature R1 permits the carpet layer 22 to smoothly slide over the mold surface 44, thereby reducing resistance on the carpet layer 22 to such movement. In turn, the reduction in resistance reduces tension on the carpet layer 22 and the tendency to bunch/wrinkle due to such tension. Similarly, the radii of curvature R1 permits the carpet layer 22 to smoothly fill out the inside corner 82, thereby also reducing resistance on the carpet layer 22 and the tendency for pressure points. In turn, this reduces the potential for "bleed through" and "ironing" of local portions of the carpet layer 22 at the corners. As will be appreciated, the contours or corners in the laminate 20 that are formed by the corners 80/82 may have the same radii of curvature as the mold surface 44.

The examples disclosed herein provide for the molding of carpet laminates with low warpage and high quality. Moreover, such features expand the design envelope for carpet laminates by permitting carpet laminates to be molded in geometries that would otherwise lead to insurmountable defects. For instance, this disclosure enables carpet laminates with draw depths of six inches or greater, such as at least 8 inches, without wrinkling or other defect that would render the carpet laminate unacceptable (e.g., aesthetically unacceptable for intended decorative use). The expanded design envelope also enables features to be molded into the polymer wall of the carpet laminate, which can be features to reduce warpage and/or locating features that facilitate assembly of the carpet laminate to other components. With reduced warpage, the position of molded-in locating features is accurate and repeatable.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A process for fabricating a molded carpet laminate, comprising:
   supporting a carpet layer in a molding tool that has first and second mold dies that define a mold cavity there between, at least one of the first or second mold dies being moveable such that the mold tool has a closed position, a partially closed position, and an open position relative to the mold cavity, and the carpet layer has a working side and a finish side, the finish side facing the first mold die, wherein the supporting of the carpet layer includes supporting the carpet layer on one or more eccentric pins in the molding tools, each of the eccentric pins including first and second offset pin sections;
   with the carpet layer in the molding tool and the mold tool in the open position, moving the first and second mold dies from the open position to the partially closed position;
   in the partially closed position, injecting a heated polymer material into the mold cavity against the working side of the carpet layer, the heated polymer material incompletely filling the mold cavity on the working side of the carpet layer;
   moving the first and second mold dies from the partially closed position to the closed position to spread the heated polymer material and fill the mold cavity on the working side of the carpet layer to form a molded polymer wall, the molded polymer wall adhering to the working side of the carpet layer to form a molded carpet laminate; and
   moving the first and second mold dies from the closed position and cooling the molded carpet laminate.

2. The process as recited in claim 1, wherein the moving of the first and second mold dies from the partially closed position to the closed position slides the carpet layer along the one or more eccentric pins to pull the carpet layer taut.

3. The process as recited in claim 1, wherein the one or more eccentric pins are rotationally adjustable.

4. The process as recited in claim 1, where the working side of the carpet layer includes an adhesive film.

5. The process as recited in claim 4, where the adhesive film is formed of polyolefin, and the carpet layer includes fibers secured to a backing, the adhesive film in contact with the backing.

6. The process as recited in claim 1, wherein a difference of at least −30° F. is maintained between a maximum temperature of the second mold die and a maximum temperature of the first mold die.

7. The process as recited in claim 1, wherein the mold cavity has a surface that contacts the carpet layer and the surface has outside corners, each outside corner having a respective outside corner radius of curvature, and all of the outside corner radii of curvature are 20 millimeters or greater.

8. The process as recited in claim 1, wherein the mold cavity has a surface that contacts the carpet layer and the surface has inside corners, each inside corner having a respective inside corner radius of curvature, and all of the inside corner radii of curvature are 25 millimeters or greater.

9. The process as recited in claim 1, including, after the moving the first and second mold dies from the closed position to the open position and prior to the removing of the molded carpet laminate from the molding tool, using the one or more eccentric pins to restrain thermal warping of the molded carpet laminate.

10. The process as recited in claim 9, wherein the molded carpet laminate includes through-holes, and the one or more eccentric pins extend in the through-holes.

11. The process as recited in claim 1, wherein the first and second mold dies form a groove in the molded polymer wall along a periphery of the molded carpet laminate, the groove having a depth ratio of about 0.3 to about 0.8.

12. The process as recited in claim 1, wherein the second mold die includes one or more slots that define a depth (D) into the second mold die and a thickness (t) perpendicular to the depth, the slot having an aspect ratio of D/t of greater than one.

13. The process as recited in claim 12, wherein the aspect ratio of D/t is greater than two.

14. The process as recited in claim 1, wherein the mold cavity includes an interior cavity portion and a gutter circumscribing the interior cavity portion, the interior cavity portion having a substantially uniform interior cavity thickness from the first mold die to the second mold die, the gutter having a gutter thickness from the first mold die to the second mold die, and in the closed position the gutter thickness is 80% or less of the uniform interior cavity thickness.

15. The process as recited in claim 1, wherein the first mold die of the mold tool includes a bead near an edge of the first mold die, the bead pinching the carpet layer when the mold tool is in the closed position.

* * * * *